United States Patent
Doemens et al.

(10) Patent No.: US 7,274,438 B2
(45) Date of Patent: Sep. 25, 2007

(54) DEVICE FOR MONITORING SPATIAL AREAS

(75) Inventors: Günter Doemens, Holzkirchen (DE); Peter Mengel, Eichenau (DE)

(73) Assignee: Siemens Aktiengesellschaft, Munich (DE)

( * ) Notice: Subject to any disclaimer, the term of this patent is extended or adjusted under 35 U.S.C. 154(b) by 290 days.

(21) Appl. No.: 10/499,668

(22) PCT Filed: Dec. 19, 2002

(86) PCT No.: PCT/DE02/04676

§ 371 (c)(1),
(2), (4) Date: Jun. 21, 2004

(87) PCT Pub. No.: WO03/056526

PCT Pub. Date: Jul. 10, 2003

(65) Prior Publication Data

US 2005/0078297 A1 Apr. 14, 2005

(30) Foreign Application Priority Data

Dec. 21, 2001 (DE) .................. 101 63 534

(51) Int. Cl.
*G01C 3/08* (2006.01)
(52) U.S. Cl. .................................... 356/5.04
(58) Field of Classification Search ............ 356/5.04
See application file for complete search history.

(56) References Cited

U.S. PATENT DOCUMENTS

| | | | |
|---|---|---|---|
| 5,321,490 A | * | 6/1994 | Olson et al. ............ 356/5.03 |
| 5,694,203 A | * | 12/1997 | Ogawa ................... 356/5.04 |
| 5,752,215 A | | 5/1998 | Vermeulen |
| 6,373,557 B1 | * | 4/2002 | Mengel et al. .......... 356/4.07 |

FOREIGN PATENT DOCUMENTS

| | | |
|---|---|---|
| DE | 41 42 097 | 7/1992 |
| DE | 41 19 797 | 1/1993 |
| DE | 196 19 186 | 1/1998 |
| DE | 197 57 595 | 7/1999 |
| DE | 199 47 023 | 5/2001 |
| EP | 1 089 030 | 4/2001 |
| WO | 99/34234 | 7/1999 |

OTHER PUBLICATIONS

Paul Profos, T. Pfeifer, "Handbuch der industriellen Meftechnik", Oldenbourg-Verlag, 1992, pp. 444-447, 474.

* cited by examiner

*Primary Examiner*—Thomas H. Tarcza
*Assistant Examiner*—Luke D. Ratcliffe
(74) *Attorney, Agent, or Firm*—Young & Thompson

(57) ABSTRACT

A monitoring device (1) for spatial areas (2) includes emitters (3) that emit radiation pulses that are reflected by objects located within the spatial areas (2) toward receivers (4). The receivers (4) are connected to a run time determining unit (9) with whose aid a distance image of an object within the spatial areas (2) can be generated. A selection unit (10) evaluates the distance images and generates a detection signal at an output (11) when predetermined distance values occur in the distance images.

13 Claims, 6 Drawing Sheets

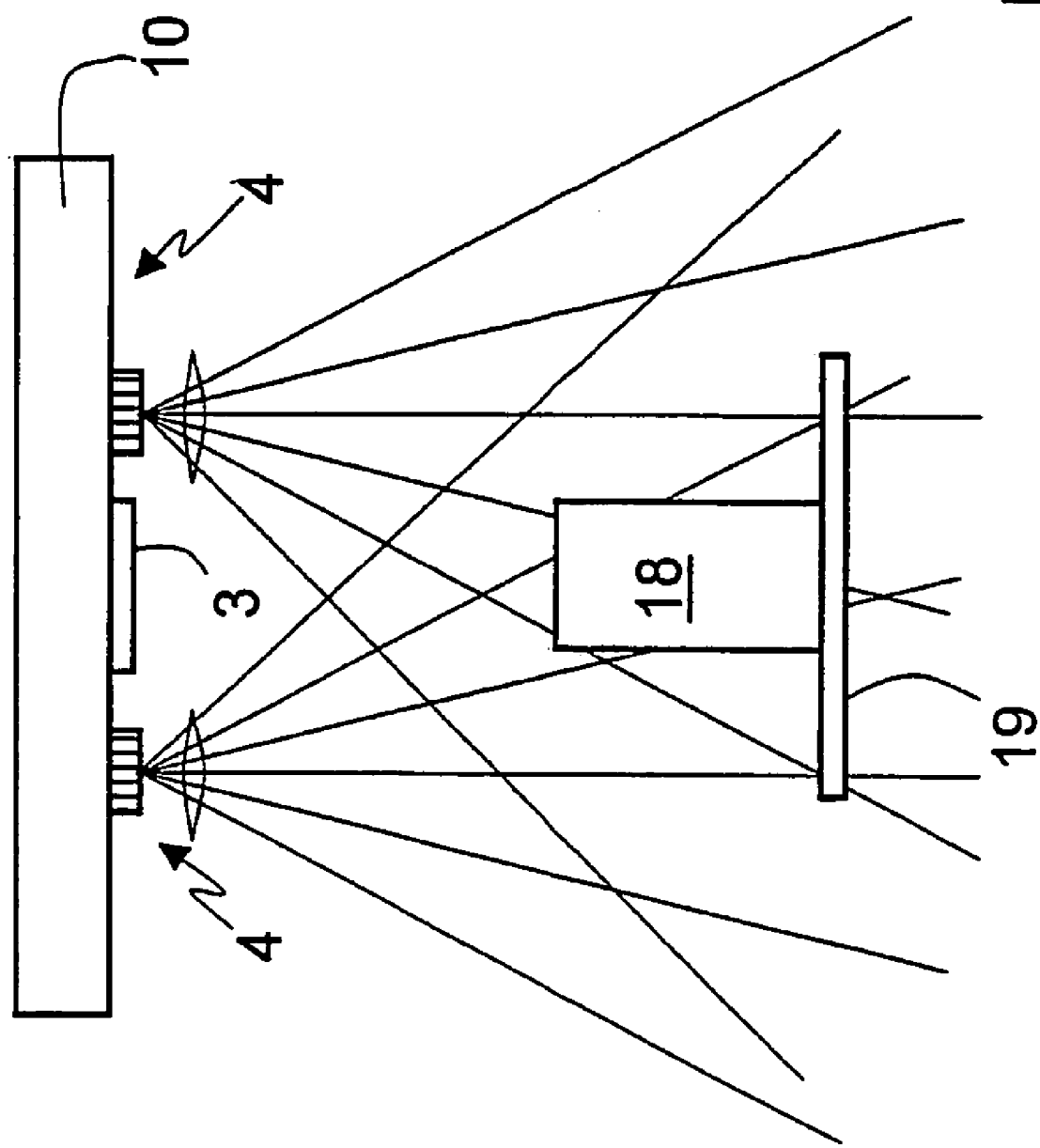

DEVICE FOR MONITORING SPATIAL AREAS

BACKGROUND OF THE INVENTION

The invention relates to a device for monitoring spatial areas with an emitter emitting radiation and a receiver receiving the emitted radiation, which is connected to an evaluation unit. The invention also relates to uses for the device.

Such devices are for example known as light curtains. Light curtains are used in numerous fields to safeguard hazard areas or to protect people or objects. They are an industrial mass-produced article. One typical application is personal protection in the working area of production equipment.

Essentially light curtains are a series of individual light barriers lined up along the entire monitoring area. A distinction is made here between passive and active variants. The active variants each comprise emitters with receivers opposite, while the passive variants comprise adjacent emitters and receivers, whereby the light emitted by the receivers is reflected back to the receivers by reflectors arranged opposite the emitters.

The known light curtains necessitate high assembly and method costs, as a plurality of individual light barriers has to be arranged along the entire monitoring area and housed in correspondingly large housings. Also the high level of susceptibility to failure of the known light curtains is disadvantageous. For example it is possible for incidental reflection from water surfaces to simulate the presence of people. Such failures occur principally in winter, when snow brought into buildings on people's shoes melts and forms small puddles. Also paper left in the monitoring area of the light curtains can cause incidental reflection and failure of the light curtains.

A device is also known from WO 99/34234 for recording a three-dimensional distance image. In the device for recording a three-dimensional distance image, light pulses are sent from an emitter towards an object to be measured, which are then reflected back to an optoelectronic CMOS sensor with a plurality of pixels with short-time integration. For a distance measurement a time measuring window is opened in the CMOS sensor, the duration of which corresponds to a predefinable integration time. The integration time is smaller than or equal to the length of the emitted light pulses. At the end of the integration time, the integration of the light pulses received by the pixels of the CMOS sensor is uniformly terminated. If the differences in reflectivity can be ignored, the charge assigned to each pixel of the CMOS sensor is a measure of the runtime of a light pulse assigned to the respective pixel. Recordings with different integration times allow the influence of reflectivity, which is different for different object points, to be eliminated. A three-dimensional distance image can therefore be calculated from the charges stored in the individual pixels of the CMOS sensor.

SUMMARY OF THE INVENTION

Based on this prior art, the object of the invention is to create an improved device for the optical monitoring of spatial areas.

This object is achieved according to the invention in that the emitter emits radiation pulses and the receiver has an optical system, with which the spatial area to be monitored can be mapped onto a semiconductor sensor with a plurality of light-sensitive elements with short-time integration, downstream from which a run-time determining unit is connected to determine the runtime of the radiation pulses. Said runtime determining unit outputs to a selection unit, which outputs a detection signal at one output when predefinable runtime values occur.

In the case of the device according to the invention the monitoring object is measured using a runtime measurement for light pulses. The selection unit ensures that only those objects, which are at a predefined distance from the device according to the invention, trigger a detection signal. It is therefore not possible with the device according to the invention for objects with a high reflection capacity located randomly in the monitoring area of the device to trigger an erroneous detection signal.

A further advantage of the device according to the invention is the simplicity with which it can be fitted, as only a single emitter and one receiver have to be fitted in proximity to the spatial area to be monitored. Unlike the prior art, it is therefore not necessary to fit a plurality of emitters with reflectors or receivers opposite them along the spatial area to be monitored. With the device according to the invention the emitters and receivers are instead combined in one semiconductor sensor, which can be fitted simply so that a spatial area to be monitored can be comprehensively monitored.

As the device according to the invention does not require reflectors, it does not have to be ensured that the reflectors exhibit the same reflectivity over the period. It is therefore not necessary, as with the prior art, to protect the reflectors from dirt. The device according to the invention is therefore low-maintenance.

The use of semiconductor sensors also offers the advantages of large-scale production at low unit cost. Adaptation to the respective application can be achieved by programming the selection unit. Devices according to the invention do not therefore have to be adapted to the respective application at the time of production, so that large numbers of the finished devices can be produced.

With one preferred embodiment of the invention the selection unit is able to distinguish objects present in the spatial area to be monitored. With this embodiment the selection unit attempts to calculate a profile from the measured runtime values and this profile is then compared with profile samples stored in the selection unit. If there is sufficient correspondence between the profile sample and the calculated profile, the selection unit emits a detection signal.

This device is therefore particularly advantageous, if only specific objects, for example people, are to trigger a detection signal in the spatial area to be monitored.

The device according to the invention is suitable for a series of applications:

The device according to the invention is suitable for example for traffic counting purposes, for example for counting vehicles, whereby the device according to the invention is also able to distinguish between different types of vehicle.

In local public transport in particular there is a need for reliable counting devices to count passengers. Arranging the device according to the invention in the transit area, such as barriers for canceling tickets, pedestrian ways or doors of public trans port vehicles, allows the passengers passing through the spatial area to be monitored to be counted.

A further application is the monitoring of rail tracks alongside platforms, as in future railed vehicles will be controlled fully automatically without drivers. To ensure that there is no one on the track when a train arrives, devices according to the invention are arranged along the edge of the platform, preferably monitoring the spatial area above the tracks. As the device according to the invention does not require reflectors opposite the emitters, the emitters and receivers can be integrated in the substructure of a platform and there is no need for reflectors on the opposite side.

Further applications relate to automatic door opening systems or door closing units, with which in particular the reduced susceptibility to failure of the device according to the invention is advantageous.

The device according to the invention can also be deployed to improve safety at work. In particular the working area of a machine tool, for example a stamping machine or a press, can be safeguarded with the device according to the invention. If a person enters the working area of the machine tool to be monitored, the device according to the invention emits a detection signal, which causes the machine tool to stop immediately.

A further possible application is the determination of the volume of goods on a conveyor belt. This makes particular use of the ability of the device according to the invention to identify profiles.

THE INVENTION IS EXPLAINED IN DETAIL BELOW WITH REFERENCE TO THE ATTACHED DRAWING, IN WHICH:

FIG. 4 shows the device from FIG. 1 monitoring a conveyor belt;

DESCRIPTION OF THE PREFERRED EMBODIMENTS

Figure 1:
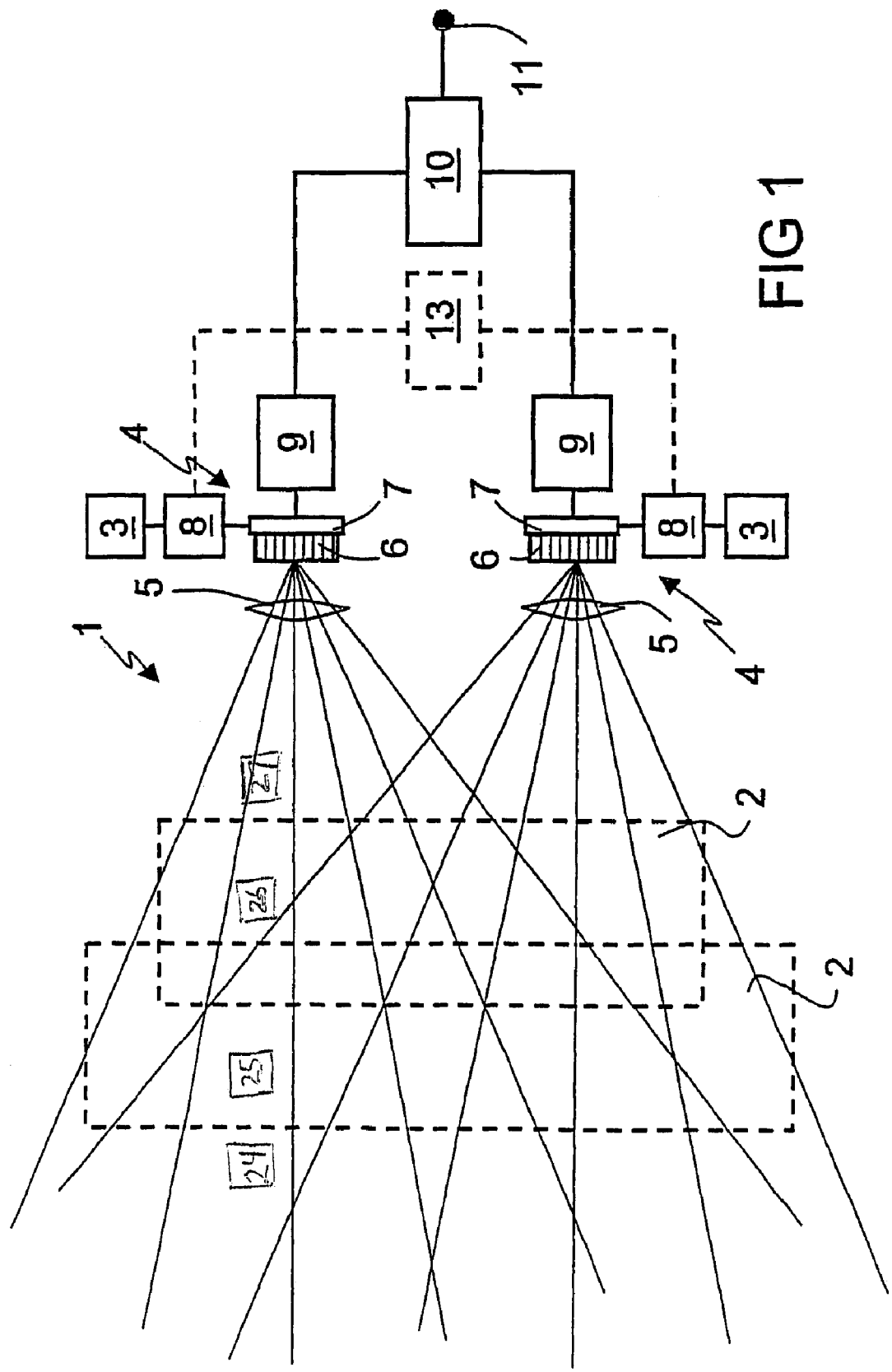
FIG. 1 shows a device for the optical monitoring of spatial areas.

FIG. 1 shows the monitoring device 1 for monitoring spatial areas 2. The monitoring device 1 has emitters 3, which emit short radiation pulses towards the spatial areas 2 to be monitored. The emitter 3 comprises LEDs or lasers, which preferably emit in the infrared wavelength range. The radiation pulses are reflected back from objects in the spatial areas 2 to the receivers 4. The receivers 4 comprise an optical system 5, by means of which objects in the spatial areas 2 can be mapped onto pixels 6 of a CMOS sensor 7 with short-time integration. The CMOS sensor 7 is a monolithically integrated optoelectronic semiconductor sensor, which was produced using CMOS technology. It should be possible to control each of the individual pixels 6 of the CMOS sensor 7, if required. The pixels 6 of the CMOS sensor 7 each respectively comprise a photodiode and an assigned pixel capacitor, which is charged by exposure of the photodiode when the time measuring window is open. The residual charge remaining after exposure of the photodiode is therefore a measure of the quantity of light or radiation energy acquired by the photodiode. The pattern over time of short-time integration in the CMOS sensor 7 is controlled by a timer 8, which is connected both to the emitter 3 and to the CMOS sensor 7.

The pixel voltage values corresponding to the residual charges in the pixel capacitors can be read and analyzed by a runtime determining unit 9. A distance value is assigned to every pixel 6 of the CMOS sensor 7 by the runtime determining unit 9. The runtime determining unit 9 therefore generates a distance image of an object in the spatial areas 2. The distance values calculated by the runtime determining unit 7 are then fed to a selection unit 10, which then emits a detection signal at one output 11, when the distance values correspond to the predefined spatial areas 2.

Figure 2:
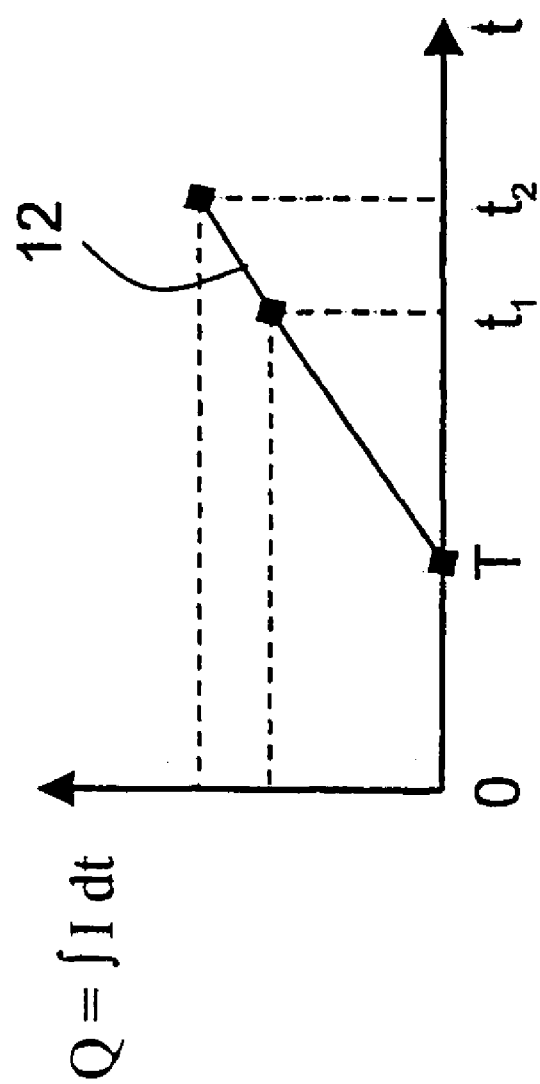
FIG. 2 shows a diagram of the pattern over time of the measuring method used with the device from FIG. 1.

The principle of the method used in the receivers 4 is explained below with reference to FIG. 2. To determine the distance of an object point in the spatial areas 2, a radiation pulse is emitted from each emitter 3 and the associated CMOS sensor 7 is activated for a first time interval of duration $t_1$. A graph 12 shows the integrated current flow across the photodiode, which discharges the associated pixel capacitor. The graph 12 therefore shows the charge discharged across the photodiode at a specific time. At the end of the first time interval, i.e. at time $t_1$, the entire charge discharged across the photodiode assumes a value $Q_1$. To eliminate the influence of different reflectivities at the object point, a radiation pulse is again emitted from the emitter 3, activating the pixels 6 on the CMOS sensor 7 for a second time interval of duration $t_2$. The duration of the second time interval is longer or shorter than the duration of the first time interval. At the end of the second time interval, i.e. at time $t_2$, a value $Q_2$ results for the quantity of charge discharged across the photodiode. The two measurement values $Q_1$ and $Q_2$ at time $t_1$ and $t_2$ can be used to produce the straight line 12, which intersects with the time axis to give the runtime T of the radiation pulse from the emitter 3 to the object point and back to the respective pixel 6. The runtime T can therefore be used to calculate the distance of the object point in the spatial area 2 from the receiver 4. The distance d can thereby be obtained approximately from the formula $d=c*T/2$, whereby c is the speed of light. The distance values are calculated by the runtime determining unit 9, which reads the measurement values of successive measurements from the CMOS sensor 7. The distance can thereby be determined within around 5 ms.

It should be noted that the runtime determining unit and the timer 8 can be integrated together with the CMOS sensor 7 on a single semiconductor chip. If there is only one emitter 3 and one receiver 4, it can also be expedient to integrate the selection unit 10 on the semiconductor chip. This results in a compact device comprising emitter 3 and receiver 4 for the optical monitoring of spatial areas 2. If there are a plurality of emitters 3 and receivers 4 however, it is expedient to integrate only one emitter 3, one-CMOS sensor 7, one timer 8 and one runtime determining unit 9 respectively on one semiconductor chip. In order to prevent interference between the individual emitters 3 and receivers 4, the timers are synchronized by a synchronizing device 13 shown with a broken line in FIG. 1 so that one of the emitters 3 and receivers 4 respectively takes a measurement.

The selection unit 10 is able to generate a profile of the objects present in the spatial area 2 to be monitored from the distance images created by the runtime determining units 9. Only those distance values, which are within a predefinable value range, which corresponds to the spatial area 2, are thereby taken into account. The monitoring device 1 can therefore be parameterized in respect of the spatial area 2 to be monitored.

The restriction to predefined distance values prevents the monitoring device 1 also emitting a detection signal at the output 11, when an object outside the spatial areas 2 reflects back the radiation pulses emitted by the emitters 3 towards the receivers 4. With the monitoring device 1 shown in FIG. 1 a detection signal is therefore only emitted at the output 11, when there is actually an object in the spatial areas 2. It is therefore not possible with the monitoring device 1 for an object outside the spatial areas 2 to trigger a detection signal erroneously. The monitoring device 1 is in particular not deceived by incidental reflections, for example from water surfaces or paper surfaces. The monitoring device 1 shown in FIG. 1 is therefore superior to conventional light curtains.

With reference to FIG. 1, objects 24-27 are illustrated. Objects 24 and 27 are outside both spatial areas 2. Object 27 is in front of both spatial areas 2. Object 24 is behind both spatial areas 2.

Object 26 is within the spatial area 2 closest to the monitoring device 1, and is in front of the spatial area 2 further from the monitoring device 1. Object 25 is within the spatial area 2 furthest from the monitoring device 1, and is behind the spatial area 2 nearest the monitoring device 1.

It is also possible with the monitoring device 1 to compare the measured distance values with a predefined profile. For example the selection unit 10 can attempt to match different, predefined profile samples to the profile created by the measurement values, whereby the mean quadratic deviation is a measure of correspondence. This can be used to distinguish different objects and emit characteristic detection signals at the output 11 for each of the different objects. It is also possible to store the interfaces of the spatial areas 2 to be monitored as a reference profile. This is particularly expedient, if for example a door is to be monitored by the monitoring device 1. When monitoring a door, it is for example expedient to store the interfaces of the door frame as a reference profile in the selection unit 10, so that the selection unit 10 is able to detect a deviation from the reference profile, when a person passes through the door.

Figure 3:
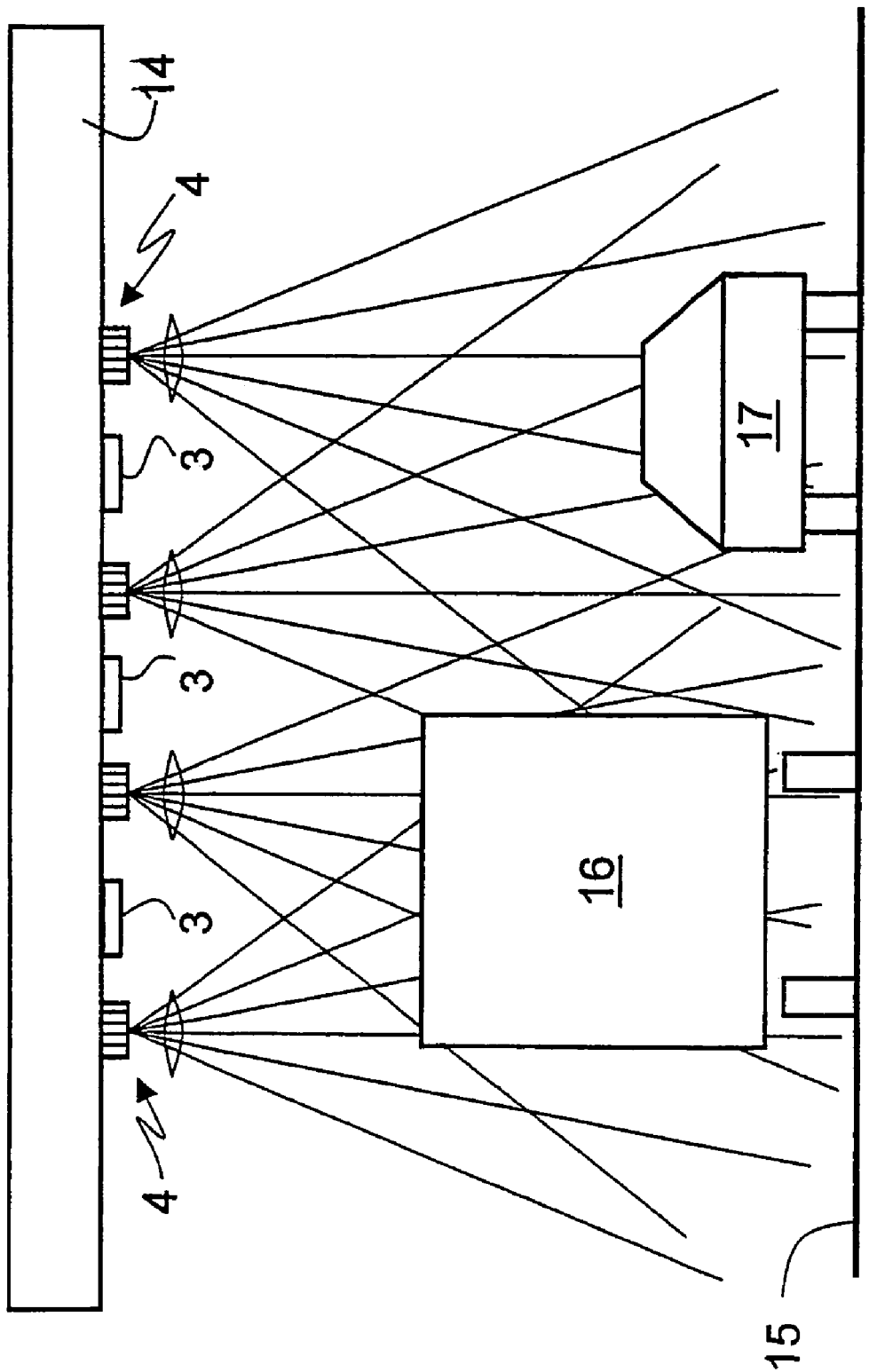
FIG. 3 shows the device from FIG. 1 counting traffic on a road.
Figure 6:
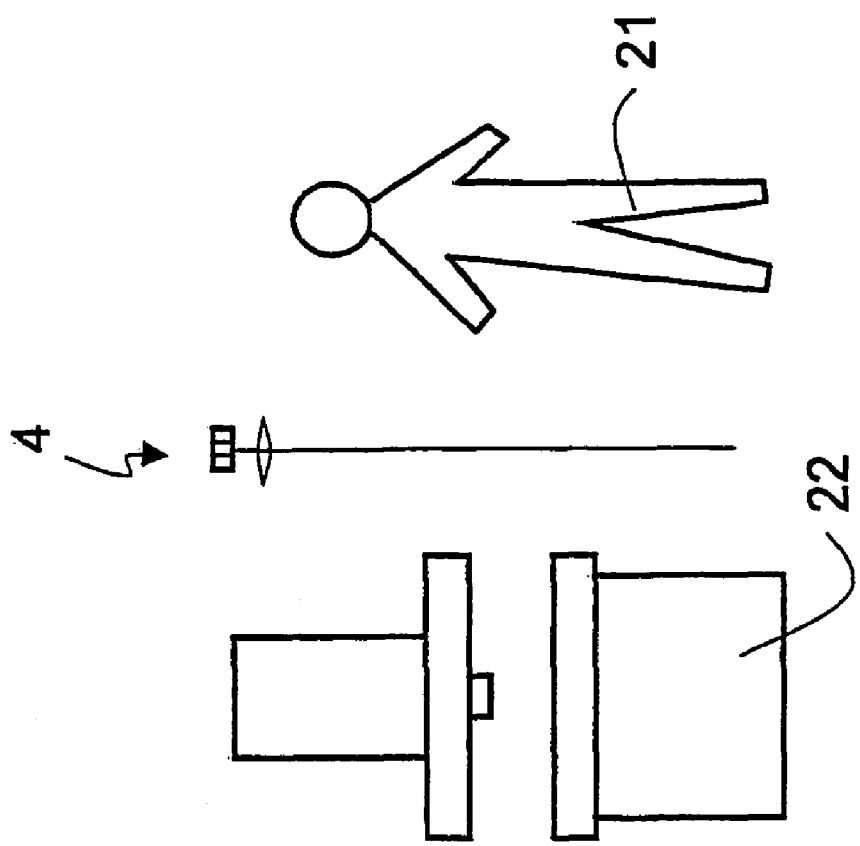
FIG. 6 shows the device from FIG. 1 monitoring a machine tool.

As well as monitoring entrances, the monitoring device 1 is also suitable for further applications. Such an application is shown in FIG. 3. With such applications the monitoring device 1 is used to monitor traffic density on a multi-lane road. For this purpose the emitters 3 and receivers 4 are attached to a support 14 above a road 15. The monitoring device 1 can be used to distinguish between trucks 16 and private automobiles 17 on the road 15. The monitoring device 1 is thereby not deceived by reflections off the surface of the road 15. Such reflections off the surface of the road 15 can be caused by puddles in bad weather. As the monitoring device 1 is however only sensitive to objects, which are at a defined distance from the monitoring device 1, such puddles do not trigger erroneous counting events.

A further application is shown in FIG. 4. With such applications the monitoring device 1 is used to determine the volume of goods, for example baggage items 18, on a conveyor belt 19. This is possible without any problems, as the cross-sectional profile of the baggage items 18 can be measured with the monitoring device 1. As the speed of the conveyor belt 19 is known, the volume of the baggage items 18 can be determined from the consecutively measured cross-sectional profiles of the baggage items 18 and the known speed of the conveyor belt 19.

Figure 5:
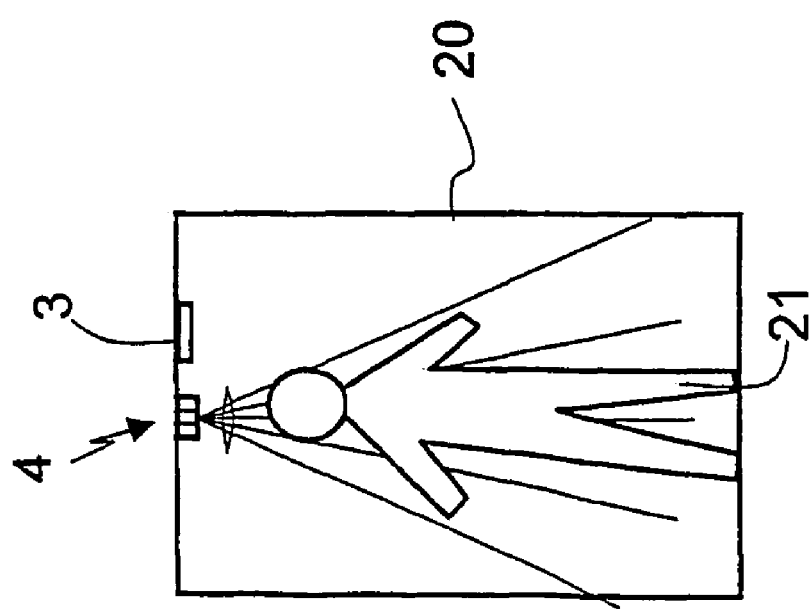
FIG. 5 shows the device from FIG. 1 monitoring an automatically operated door.
Figure 7:
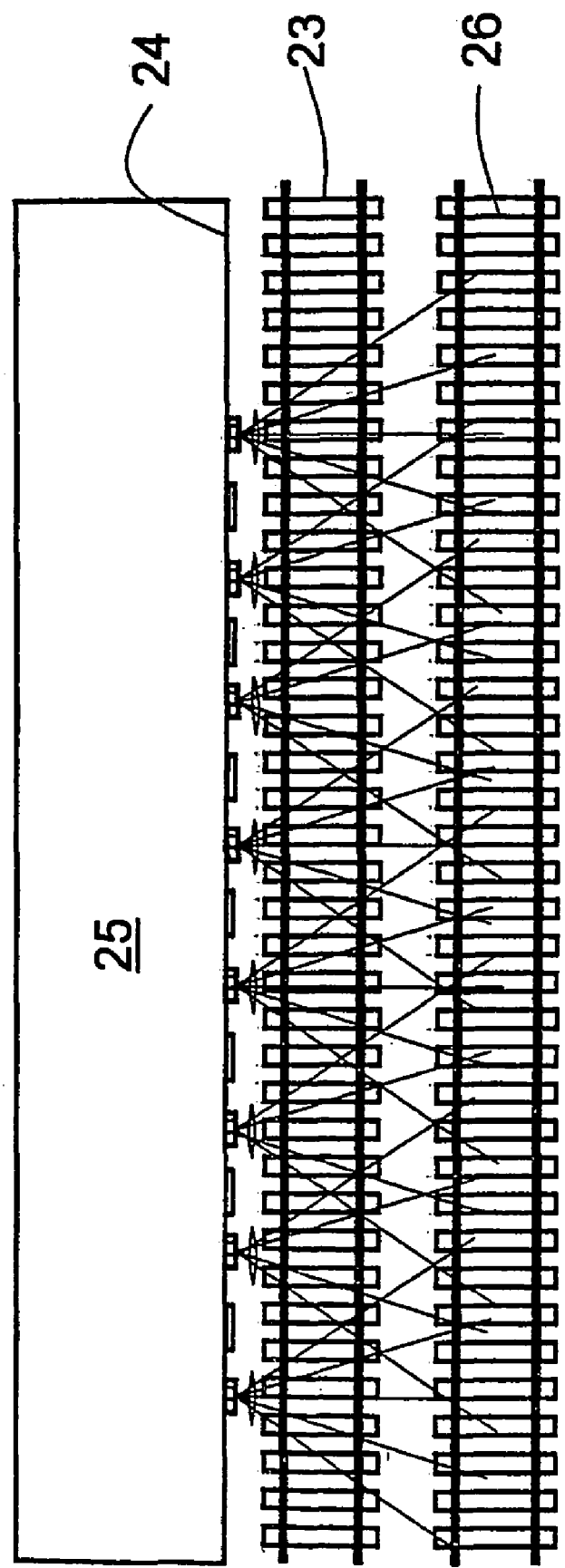
FIG. 7 shows the device from FIG. 1 arranged along the edge of a platform monitoring a track.

FIG. 5 shows a further application of the monitoring device 1, namely the deployment of the monitoring device 1 in proximity to an automatically operated door 20. This door 20 can be an elevator door. The monitoring device 1 can be used to detect the presence of a person 21 in the door area and to prevent unintended closing of the doors 20 of the elevator. The same also applies to doors 20 of public transport vehicles. It is also necessary here to prevent the door 20 closing if there is a person in the door area. A monitoring device 1 can also be used to count passengers passing through the door 20. In this context the ability of the monitoring device 1 to distinguish between objects is useful, as the monitoring device 1 can be used to identify people 21 as such and count them.

A further area of deployment is the safeguarding of production equipment 22. In this context the low susceptibility of the monitoring device 1 to failure is particularly advantageous, as the production process should operate with as few stoppages as possible. As the monitoring device 1 however only emits a detection signal at the output 11, when a person 21 actually enters the monitored spatial area 2, the monitoring device 1 is a suitable means for ensuring safety at work, in that an adequate distance is maintained between production personnel and the working area of the production equipment 22.

Finally the monitoring device 1 can also be used to monitor the track space above a track 23 along the edge 24 of a platform 25. With the device 1 it is possible to monitor the track space above the track 23 continuously for obstacles. Reflection devices on the side of the track 23 opposite the platform edge 24 are not necessary for this purpose, as might for example be required with conventional light barriers. Conventional light barriers would also only cover the track space continuously, if emitters and receivers were arranged in an adjacent manner at short distances from each other along the platform edge. On the contrary, it is sufficient to arrange a plurality of the monitoring devices 1 at regular intervals along the platform edge 24, to be able to monitor the track space above the track 23 continuously. Continuous monitoring of the track space along the platform edge 24 is however a prerequisite for the fully automatic control of railed vehicles, which is for example an objective for local public transport.

The restriction of the monitored spatial area 2 in a direction perpendicular to the track 23 should in particular be emphasized in this context. This means that trains passing on an adjacent track 26 do not trigger an erroneous alarm.

The invention claimed is:

1. A monitoring device that produces a light curtain for monitoring spatial areas (2), comprising:
    a combination of at least one emitter (3) for emitting radiation pulses into an area and at least one receiver (4) for receiving emitted radiation as reflected from an object within the area,
    the emitted radiation pulses forming a reflectorless light curtain,
    said at least one receiver having a semiconductor sensor (7) with a plurality of light-sensitive elements (6) with short-time integration for mapping a predefined spatial area (2) within the area into which the radiation pulses are emitted; wherein,
    the spatial area is defined by a predefined distance value range,
    said at least one emitter and said at least one receiver are located on a same side of the spatial area,
    the at least one receiver (4) is connected to an evaluation unit, the evaluation unit comprising a runtime determining unit (9) connected to said plurality of light-sensitive elements (6),
    said runtime determining unit (9)
        generates a distance image of the object based on a measuring runtime (T) of the radiation pulses emitted from the emitter (3) to the object and reflected back to the elements (6) of the sensor (7) and calculating a distance value of the object from the receiver (4), and determines whether the monitored object is one of i) in front of the spatial area (2) and ii) behind the spatial area (2) based on a comparison of the calculated distance value to the predefined distance value range, wherein said emitter and said receiver are reflectorless and the device is free of any reflectors.

2. The monitoring device that produces a light curtain for monitoring spatial areas (2) according to claim 1, wherein distance images of objects are determined using a plurality of the distance values.

3. The monitoring device that produces a light curtain for monitoring spatial areas (2) according to claim 1, wherein each said receiver (4) comprises a field of the light-sensitive elements (6).

4. The monitoring device that produces a light curtain for monitoring spatial areas (2) according to claim 1, wherein each said receiver (4) comprises a plurality of the light-sensitive elements (6) arranged in a row.

5. The monitoring device that produces a light curtain for monitoring spatial areas (2) according to claim 1, wherein the light-sensitive elements (6) are integrated on a semiconductor chip.

6. The monitoring device that produces a light curtain for monitoring spatial areas (2) according to claim 1, wherein the runtime determining unit (9) is integrated together with the light-sensitive elements (6) in a semiconductor chip.

7. The monitoring device that produces a light curtain for monitoring spatial areas (2) according to claim 1, wherein said evaluation unit further comprises a selection unit (10) that verifies runtime values determined by said runtime determining unit for correspondence with a predefinable profile.

8. The monitoring device that produces a light curtain for monitoring spatial areas (2) according to claim 1, wherein the light curtain is arranged and adapted for counting objects, and wherein the light curtain is located in an area of users (16, 17, 21) whose arrival in the spatial area (2) to be monitored triggers a count signal at the output of the evaluation unit.

9. The monitoring device that produces a light curtain for monitoring spatial areas (2) according to claim 8, wherein the light curtain is arranged and adapted for counting people.

10. A monitoring device that produces a light curtain for monitoring a spatial area (2), comprising:

an infrared wavelength radiation pulse emitter (3) configured to emit infrared wavelength radiation pulses to form a reflectorless light curtain covering a predefined spatial area, the spatial area being defined by a predefined distance value range;

a receiver (4) configured to receive the radiation pulses as reflected back from an object, the emitter and receiver being on a same side of the spatial area, the receiver comprising an optical system (5) that maps the received reflected radiation pulses onto pixels (6) of a sensor (7) so that the pixels' exposure to the received reflected radiation pulses charges each pixel to measure a quantity of radiation energy acquired by each pixel; and a runtime determining unit (9) connected to the pixels and configured i) to calculate a distance value of the object from the receiver, and ii) using the distance value, to determine whether the object is outside the spatial area, wherein, generating the distance value comprises emitting a first radiation pulse from the emitter and activating the pixels for a first time interval (t1) to measure a first exposure to the pixels of the first radiation pulse, and emitting a second radiation pulse from the emitter and activating the pixels for a second time interval (t2) to measure a second exposure to the pixels of the second radiation pulse, the first and second time intervals being of different durations, the first and second exposure measurements at each pixel determining a runtime (T) of the radiation pulses from the emitter to the object and back to each pixel, and using the determining runtime in calculating the distance value of the object from the receiver, the distance value being used to determine whether the object is outside the spatial area, the calculated distance value being outside the predefined distance value range corresponding to the spatial area indicating the object being outside the spatial area, wherein the emitter and the receiver are reflectorless and the device is free of any reflectors.

11. The monitoring device that produces a light curtain for monitoring a spatial area (2), of claim 10 further comprising:

a selection unit (10) connected to the runtime determining unit and configured to detect the object being in the spatial area based on the distance value received from the runtime determining unit being with a value range corresponding to the spatial area, the selection unit emitting a detection signal at an output (11) upon the detection of the object in the spatial area, wherein, a restriction to predefined distance values prevents the selection unit emitting the detection signal at the output when the runtime determining unit determines the object is outside the spatial area.

12. A monitoring device that produces a light curtain for monitoring a spatial area (2), comprising:

a radiation pulse emitter (3) configured to form a reflectorless light curtain covering a predefined spatial area by emitting radiation pulses;

a receiver (4) configured to receive radiation pulses as reflected back from an object, the emitter and receiver being on a same side of the spatial area, the receiver comprising an optical system (5) that maps the received reflected radiation pulses onto pixels (6) of a sensor (7); and a runtime determining unit (9) connected to the pixels and configured to determine that a first object is outside the spatial area upon receiving radiation pulses reflected from the first object located outside the spatial area, and issue a detection signal upon receiving radiation pulses reflected from objects located inside the spatial area, wherein, the runtime determining unit calculates a distance value of the first object from the receiver, and uses the calculated distance value to determine that the first object is outside the spatial area, calculating the distance value comprises emitting first and second radiation pulses, of different time durations, from the emitter and measuring corresponding respective radiation exposures at one pixel of the pixels to determining a runtime (1) of the first and second radiation pulses from the emitter to the first object and back to the one pixel, and using the determined runtime to calculate the distance value of the first object from the receiver, the calculated distance value being outside a predefined distance value range corresponding to the spatial area indicating the first object being outside the spatial area, wherein the emitter and the receiver are reflectorless and the device is free of any reflectors.

13. The device of claim 1, wherein there is exactly one emitter (3) and one receiver (4), and the entire device is reflectorless.

* * * * *